(12) United States Patent
Soda

(10) Patent No.: US 8,089,645 B2
(45) Date of Patent: Jan. 3, 2012

(54) IMAGE PROCESSING APPARATUS, IMAGE PROCESSING SYSTEM AND IMAGE PROCESSING PROGRAM

(75) Inventor: Kazunori Soda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 811 days.

(21) Appl. No.: 12/118,842

(22) Filed: May 12, 2008

(65) Prior Publication Data

US 2008/0297837 A1 Dec. 4, 2008

(30) Foreign Application Priority Data

May 29, 2007 (JP) ................................. 2007-141410

(51) Int. Cl.
*G03G 15/20* (2006.01)
*G06F 3/12* (2006.01)
(52) U.S. Cl. ...................... 358/1.14; 358/1.15; 358/1.16; 358/1.17; 399/70; 399/82; 399/88
(58) Field of Classification Search ......... 358/1.13–1.18
See application file for complete search history.

(56) References Cited

U.S. PATENT DOCUMENTS

| | | | | |
|---|---|---|---|---|
| 7,076,673 | B2 * | 7/2006 | Yoshikawa | 713/300 |
| 7,516,335 | B2 * | 4/2009 | Watanabe | 713/300 |
| 2004/0213615 | A1 * | 10/2004 | Nakao | 400/76 |
| 2006/0007468 | A1 * | 1/2006 | Tanaka | 358/1.14 |
| 2006/0283939 | A1 * | 12/2006 | Hwang | 235/382 |
| 2007/0043884 | A1 * | 2/2007 | Watanabe | 710/15 |
| 2007/0247467 | A1 * | 10/2007 | Kaneda | 345/531 |

FOREIGN PATENT DOCUMENTS

| | | |
|---|---|---|
| JP | 09-083693 | 3/1997 |
| JP | 10-243134 | 9/1998 |
| JP | 11-085420 | 3/1999 |
| JP | 11085420 A * | 3/1999 |

* cited by examiner

*Primary Examiner* — Chan Park
(74) *Attorney, Agent, or Firm* — Renner, Otto, Boisselle & Sklar, LLP

(57) ABSTRACT

An image processing apparatus which receives print data transmitted from an information processing device, includes: a storage for storing the received print data when the data is confidential print data, together with its ID information; an input control portion for allowing for input of ID information; and a controller having the function that, when detecting input of ID information, outputs the confidential print data corresponding to the input ID information and the function of switching the image forming portion from normal power status to power saving status when no print request has been made for a fixed period of time. When the confidential print data has been stored in the storage, the controller gives notice that the image forming portion will transition to the power saving status to the information processing device before the image forming portion transitions to the power saving status, and the controller delays the transition by a predetermined period of time when the controller receives an extension request from the information processing device to postpone the transition of the image forming portion to the power saving status.

7 Claims, 11 Drawing Sheets

FIG. 4

Job Table

| Job No. |
|---|
| JOB1 |
| JOB2 |
| JOB3 |

Confidential job table

| Serial No. | Confidential No. | Detection of Confidential number input |
|---|---|---|
| SINT1 | 9889 | None |
| SINT2 | 8543 | None |
| SINT3 | 1219 | None |

FIG. 5

Job Table

| Job No. |
|---|
| JOB1 |
| JOB2 |
| JOB3 |

Confidential job table

| Serial No. | Confidential No. |
|---|---|
| SINT1 | 9889 |
| SINT2 | 8543 |
| SINT3 | 1219 |

← Input of the confidential number is detected.

FIG. 6

Job Table

| Job No. |
|---|
| JOB4 |
| JOB1 |
| JOB2 |
| JOB3 |

(←SINT2)

Confidential job table

| Serial No. | Confidential No. |
|---|---|
| SINT1 | 9889 |
| SINT3 | 1219 |

(SINT 2 is deleted from the confidential job table)

FIG. 7

Confidential job table

| Serial No. | Confidential No. | Job requesting user's Address |
|---|---|---|
| SINT1 | 9889 | sato@xxcop |
| SINT2 | 8543 | tanaka@xxcop |
| SINT3 | 1219 | yamada@xxcop |

FIG. 8

Extension request record table (e-mail response)

| Job requesting user's Address | Requested extension time |
|---|---|
| sato@xxcop | 3 min. |
| yamada@xxcop | 10 min. |

IMAGE PROCESSING APPARATUS, IMAGE PROCESSING SYSTEM AND IMAGE PROCESSING PROGRAM

This Nonprovisional application claims priority under 35 U.S.C. §119(a) on Patent Application No. 2007-141410 filed in Japan on 29 May 2007, the entire contents of which are hereby incorporated by reference.

BACKGROUND OF THE INVENTION (1) Field of the Invention

The present invention relates to an image processing apparatus, image processing system and image processing program for receiving image data from information processing devices such as remote personal computers (to be referred to as PCs) by way of a communications line such as LAN (local area network) and performing image processing over the received image data and producing printed output, and in particular, relates to an image processing apparatus for suitably executing a confidential printing process when a confidential print job is received.

(2) Description of the Prior Art

As the image processing apparatus for printing out an image-processed result of image data received from without, so-called multi functional peripherals (MFPs) having basic functions such as printer, scanner, facsimile and copier functions and other various functions have been widely used. Particularly, with the recent development of communications network technology, image processing systems have been rapidly developing, which can perform various image-related processes such as transmission and reception processing of facsimile data, network print processing, transfer processing of scanned images, in cooperation with other multi functional peripherals, printers, copiers, scanner devices, facsimile machines or image processors and PCs and the like.

In such an image processing system, the image processing apparatus receives print jobs, transmitted facsimile jobs and the like from remote PCs, facsimile machines and other information processing devices by way of communications lines such as LANs, etc. Then, the image processing apparatus effects various processes over the image data contained in these jobs and outputs the image processed result to the image forming portion, where a printing process corresponding to the image data thus processed is effected and output.

Recently, based on the nowaday trend of improvement of the security consciousness relating to information processing, use of the apparatuses is spreading, which have a confidential function for preventing the content of a print job from being viewed by a third person by previously registering image ID information such as a password, PIN number or the like for every received job so as to prohibit a third person from manipulating the print job thus registered with the image ID information.

However, when print data for a print job received from a certain information processing device is confidential information, if the print data is printed out straightway, there occurs the case in which, even if the user immediately goes to the place where the image processing apparatus as the designated output end is after the user gives a printing command from the information processing device, the printing process of the print-designated print data has been already printed out. As a result, there is a fear that the printed material of the print data is viewed by a third person before the user who should receive it.

As an apparatus of performing appropriate image processing while keeping the confidentiality of the confidential information received from the information processing device thus connected by the communication line, there is a known configuration disclosed by patent document 1 (Japanese Patent Application Laid-open Hei 10-243134). The facsimile machine of patent document 1 receives from the terminal a signal that designates whether a print job to be output is confidential or usual, and it starts a printing operation of the job added with the terminal number information if the job is designated as a usual output. In contrast if the job is designated as a confidential output, the machine starts a printing operation only when a valid password is input by the user. Patent document 1 further discloses a feature that if no password has been input by the operator within a predetermined period of time after the confidential output was designated from the terminal, the print job of the confidential information is cancelled and the notice of that effect is given to the terminal and displayed on the display of the terminal.

However, most of the image processing apparatus equipped with a confidential processing function, inclusive of the above facsimile machine, entail the problem that reception of the printout becomes late because the print data including confidential information is output only after the user has reached the image processing apparatus.

Further, recent image processing apparatus (image forming apparatus) such as MFPs and the like are mostly set up so that, if a predetermined period (some minutes to ten-odd minutes) has elapsed without any printing operation, in order to essentially save the energy for the fuser unit, the apparatus status is changed from the state in which the normal power is supplied to the fuser unit (which will be referred to hereinbelow as "normal power status") to the state in which the amount of power supplied to the fuser unit is lowered (which will be referred to hereinbelow as "energy saving mode") or to the state in which the power to the fuser unit is turned off (which will be referred to hereinbelow as "fuser-off mode") If the user goes to the image processing apparatus for printing out the confidential printing when the image processing apparatus is in its power saving status such energy-saving mode or fuser-off mode, the user has to wait until the fuser unit is elevated in temperature to the predetermined level, thus the reception of the printout is delayed.

SUMMARY OF THE INVENTION

The present invention has been devised in view of the above problems with the conventional image processing apparatus, it is therefore an object of the present invention to provide a novel and improved image processing apparatus, image processing system and image processing program which can prevent the user's reception of the printout of confidential print data from being delayed by the transition of the apparatus to the power saving status.

In order to achieve the above object, in accordance with the present invention, an image processing apparatus which receives print data from an information processing device connected thereto via a communications network, together with sender information on the information processing device, develops the print data in a printable data form and prints out the data through an image forming portion, comprises: a confidential print determining portion for determining whether the print data is confidential print data; a storage for storing the confidential print data detected by the confidential print determining portion and ID information transmitted with the confidential print data; an input control portion for allowing for input of the ID information for executing a printing process of the confidential print data; and a controller having the function that, when detecting input of the ID information, outputs confidential print data corresponding to the input ID information and the function of causing the image forming portion to transition from normal power status to power saving status when no print request has been made to the image processing apparatus for a fixed period of time or longer, and is characterized in that when the image forming portion transitions from the normal power status to the power saving status while the confidential print data is being stored in the storage, the controller gives notice that the image forming portion will transition to the power saving status, to the information processing device before the transition.

Since, with this configuration, the user can transmit a confidential print job that is printed out until the image forming portion of the image processing apparatus transitions to the power saving status, it is possible to execute printout of the confidential print data before the image forming portion transitions to the power saving status. Accordingly, it is possible to prevent a third person from picking up the printout in advance before the user who ordered the printout of the confidential print data receives it, so that confidentiality of the confidential print data can be secured.

In the above configuration, when receiving an extension request from the information processing device to postpone the transition of the image forming portion to the power saving status after having given notice of the transition of the image forming portion to the power saving status to the information processing device, the controller may delay the transition of the image forming portion to the power saving status.

Since, with this configuration, the user can postpone the transition of the image processing apparatus to power saving status so as to print out the confidential print data at a desired time, it is possible to previously prevent user's reception of the printout of confidential print data from being delayed.

In the above configuration, when receiving the extension request from the information processing device, the controller may delay the transition to the power saving status in accordance with the designated extension time indicated by the extension request. Further, when the controller receives a plurality of extension requests, and if the extension times indicated by the extension requests are different, the controller may select the longest extension time among those designated by the extension requests to delay the transition to the power saving status by the selected extension time.

Since, with this configuration, the user can designate a desired time to print out the confidential print data, it is possible to guard the confidentiality of the confidential print data as well as to prevent the user's reception of the printout of confidential print data from being delayed due to the transition of the image processing apparatus to the power saving status.

In the above configuration, when the controller gave notice of the transition of the image forming portion to the power saving status to the information processing device and receives no response for extension from the information processing device, the controller may delete the confidential print data transmitted from the information processing device, from the storage.

Since, with this configuration, the print data that is not scheduled by the user to print out at hand is removed from the storage such as an HDD and the like, it is possible secure a margin in the capacity of the storage.

In the above configuration, it is possible to construct such that the storage contains a job table for recording the print data and a confidential job table for recording the confidential print data, and when the ID information is input, the confidential print data corresponding to the input ID information is transferred from the confidential job table to the job table.

Since, with this configuration, the confidential print data that has been transferred to the job table is printed out first, the user who ordered the confidential print data can receive its printout without being kept waiting.

In the above configuration, is it possible to construct such that the power saving status of the image forming portion includes a multiple of power saving modes, e.g., energy saving mode and fuser-off mode, and every time the image forming portion transitions to each of the power saving modes, the controller gives notice that the image forming portion will transition for the information processing device to the power saving mode before the transition to the power saving mode.

Since, with this configuration, it is possible to postpone the time of transition to the power saving status for every time the image forming portion transitions to each of the power saving modes, it is possible to more effectively prevent the user's reception of the printout of confidential print data from delaying due to transition to the power saving status.

Further, in order to solve the above problems, the present invention provides an image processing program for causing a computer to realize the functions of the above image processing apparatus.

Since, with this configuration, by previously installing the above image processing program into the storage such as ROM or the like in the image processing apparatus, it is possible to print out the confidential print data before the image processing apparatus transitions to the power saving status and it is also possible to keep the confidentiality of confidential print data.

In order to achieve the above object, in accordance with the present invention, an image processing system in which an image processing apparatus that receives print data from an information processing device connected thereto via a communications network, together with sender information on the information processing device, develops the print data in a printable data form and prints out the data through an image forming portion, is characterized in that the information processing device comprises a notifying portion which, after the information processing device receives notice that the image forming portion will transition from normal power status to power saving status, sends an extension request for postponing the transition of the image forming portion to the power saving status, and the image processing apparatus includes: a confidential print determining portion for determining whether the print data is confidential print data; a storage for storing the confidential print data that has been determined that the print data is confidential print data by the confidential print determining portion and ID information transmitted with the confidential print data; an input control portion for allowing for input of the ID information for executing a printing process of the confidential print data; and a controller having the function that, when detecting input of the ID information, outputs confidential print data corresponding to the input ID information and the function of switching the image forming portion from normal power status to power saving status when no print request has been made to the image processing apparatus for a fixed period of time or longer, when the image forming portion transitions from the normal power status to the power saving status while the confidential print data is being stored in the storage, the controller gives notice that the image forming portion will transition to the power saving status, to the information processing device before the transition, thereafter, when the controller receives an extension request from the information processing device to postpone the transition of the image forming portion to the power saving status, the controller delays the transition of the image forming portion to the power saving status.

Since this configuration makes it possible with to execute printout before the image processing apparatus transitions to power saving status and to print out the confidential print data at a desired time, it is possible prevent user's reception of the printout from being delayed and keep the confidentiality of the confidential print data.

As has been described, according to the present invention, before the image processing apparatus transitions to power saving status such as an energy saving mode, fuser-off mode or the like, a notice that the image processing apparatus will transition to the power saving status is given to the information processing device of the user side who ordered a confidential print job. Accordingly, the user is able to have the printout finished before the image processing apparatus transitions to power saving status.

Further, since, before the image processing apparatus transitions to power saving status, a notice of transition to power saving status is given to the user side, the user side can make an extension request for postponing the start time of transition to power saving status to the image processing apparatus so that it is possible to previously prevent the user's reception of the printout of the confidential print data from being delayed due to the transition of the image processing apparatus to power saving status.

BRIEF DESCRIPTION OF THE DRAWINGS

FIG. 4 is a chart showing an example of a job table and confidential job table written into RAM when a confidential printing process is carried out in the image processing apparatus of the same embodiment;

FIG. 5 is a chart showing an example of a job table and confidential job table written into RAM when a confidential printing process is carried out in the image processing apparatus of the same embodiment;

FIG. 6 is a chart showing an example of a job table and confidential job table written into RAM when a confidential printing process is carried out in the image processing apparatus of the same embodiment;

FIG. 7 is a chart showing an example of a job table and confidential job table written into RAM when a confidential printing process is carried out in the image processing apparatus of the same embodiment;

FIG. 8 is a chart showing an example of an extension request record table written into RAM when a confidential printing process is carried out in the image processing apparatus of the same embodiment;

DESCRIPTION OF THE PREFERRED EMBODIMENTS

Figure 1:
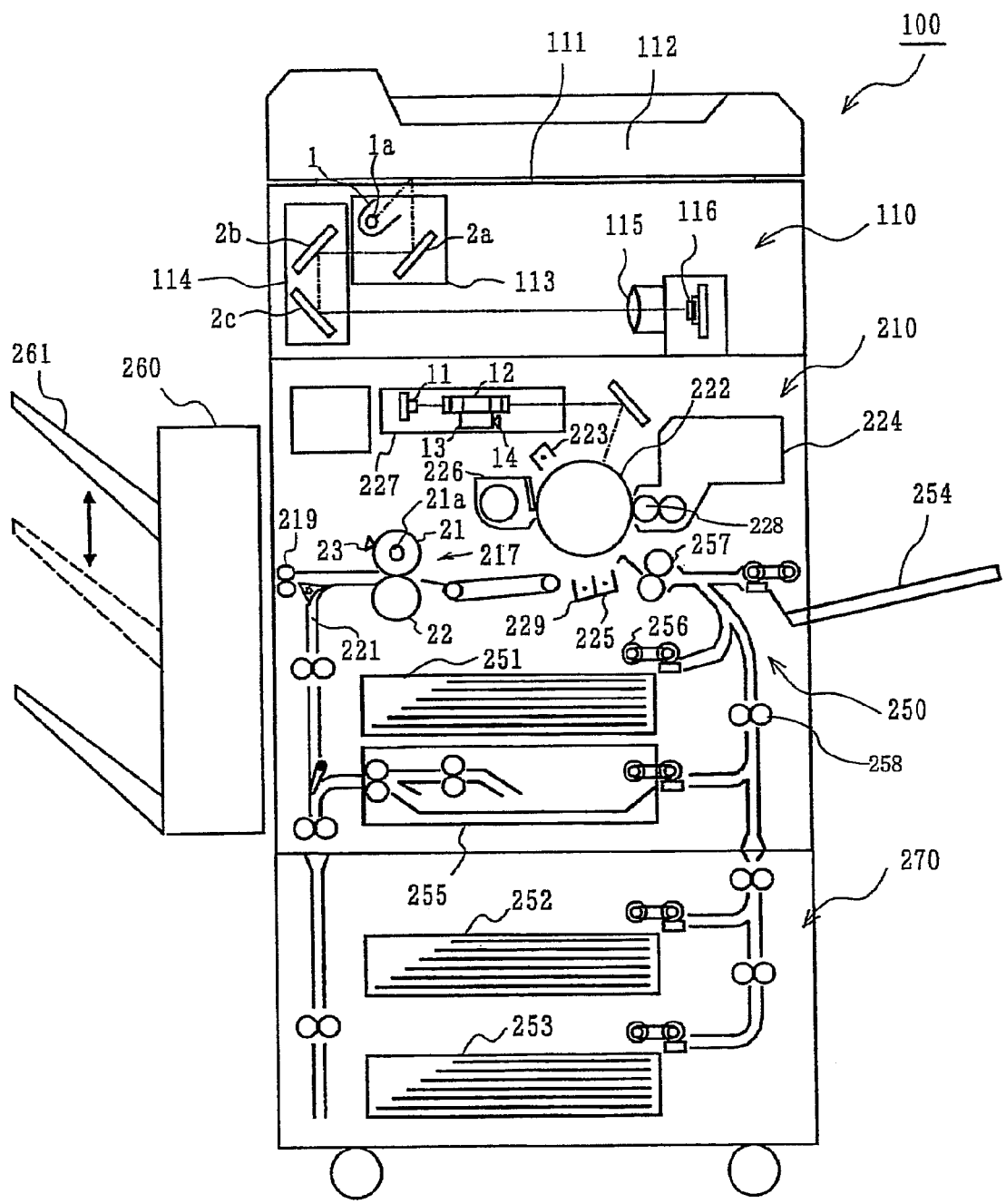
FIG. 1 is an overall configurational view showing a schematic architecture of an image processing apparatus of the first embodiment of the present invention.

The preferred embodiments of the present invention will hereinafter be described in detail with reference to the accompanying drawings. In the description and drawings herein, the components having substantially the same functions and configurations are allotted with the same reference numerals so that repeated description is omitted.

The First Embodiment

To begin with, the configuration of the first embodiment in which an image processing apparatus of the present invention is applied to an MFP (multi functional peripheral) will be described in detail with reference to the drawings. FIG. 1 is an overall configurational view showing a schematic architecture of an image processing apparatus of this embodiment.

In this embodiment, an image processing apparatus 100 has a so-called front-accessible build-up type architecture in which an image reader 110, an image forming portion 210 and a paper feed portion 250 are arranged at the top, middle and bottom, respectively. An original table 111 made of transparent glass is arranged on the top of this image processing apparatus 100. An automatic document feeder 112 for automatically feeding originals, sheet by sheet, from a document set tray stacking a plurality of originals is arranged on the original table 111. A post-processing unit 260 is mounted at one side of image forming portion 210 while a multi-layered paper feed unit 270 which also serves as a mounting base is arranged under paper feed portion 250.

Image reader 110 located under original table 111 includes a first scan unit 113, second scan unit 114, optical lens 115 and CCD line sensor 116 as a photoelectric transducer and operates in association with automatic document feeder 112 to relatively scan and read the image of the original placed on original table 111 at a predetermined exposure position. First scan unit 113 includes a light source lamp unit 1 having a light source lamp la for illuminating the original surface and a first mirror 2a that reflects the reflected image of light from the original in the predetermined direction. The intensity of illumination of light source lamp unit 1 is detected by a light intensity sensor 3 (see FIG. 2). Second scan unit 114 includes a second mirror 2b and third mirror 2c that lead the reflected image of light from the original, reflected off the first mirror 2a to CCD line sensor 116 as a photoelectric transducer. Optical lens 115 focuses and forms an image of the reflected light from the original onto the light receiving surface of CCD line sensor 116.

Image forming portion 210 includes: a main charger 223 for electrifying a photoreceptor drum 222 at a predetermined potential; a laser scanning unit (which will be referred to hereinbelow as LSU) 227 for forming an electrostatic latent image on photoreceptor drum 222 by emitting a laser beam in accordance with the image data that is transferred from document reader 110 or an unillustrated external device; a developing device 224 for supplying toner to the electrostatic latent image formed on photoreceptor drum 222 from a developing roller 228 to form a developed toner image; a transfer device 225 for transferring the toner image formed on photoreceptor drum 222 to the paper; a cleaning device 226 for collecting the toner and others left on photoreceptor drum 222 after the transfer step; and a separator 229 for separating the paper from photoreceptor drum 222 after the transfer step, and transfers the toner image formed based on the desired image data to a sheet of paper as a printed medium to perform a printing operation.

LSU 227 incorporates a semiconductor laser 11 for emitting a laser beam that is modulated based on the image data, a polygon mirror 12 that rotates to deflect the laser beam in the main scan direction and other unillustrated groups of lenses. Polygon mirror 12 is driven by a motor 13. The rotational speed of motor 13 is detected by a speed sensor 14.

Image forming portion 210 includes a fuser unit 217 as a fuser device for fusing or fixing the toner image on the paper by heating and pressing the paper with a toner image transferred thereon. Fuser unit 217 includes a pair of rollers, namely, a heat roller 21 on the upper side and a pressing roller 22 on the lower side. Heat roller 21 has a heater 21a, and the temperature of heat roller 21 is detected by a temperature sensor 23. Formed on the output side of fuser unit 217 is a switchback path 221 for inverting the moving direction of the paper so that its rear end is directed forwards when the duplex image forming mode in which images are formed on both sides of the paper is selected.

The paper on which the toner image has been fixed by fuser unit 217 is lead by a paper discharge roller 219 to post-processing unit 260 by way of switchback path 221, as needed. In this post-processing unit 260, the paper undergoes post-processing such as stapling, punching and/or the like, and is discharged onto tray 261.

Paper feed portion 250 includes: a manual feed tray 254 mounted on the side face of the main body; a duplex unit 255; a paper feed tray 251; paper feed trays 252 and 253 provided in multi-layered paper feed unit 270. These paper feed trays 251 to 254 each stack a plurality of sheets. Paper feed portion 250 incorporates a paper conveying portion including: a paper feed rollers 256 for picking up the topmost paper P, sheet by sheet, from the stacks of paper on paper feed trays 251 to 254 to deliver the paper toward image forming portion 210; a plurality of conveying rollers 258 for conveying the fed paper to the transfer station between photoreceptor drum 222 and transfer device 225 in image forming portion 210; and a registration roller 257 for positioning the leading end of the fed paper in register with the toner image on photoreceptor drum 222 before the fed paper is delivered to the transfer station. Duplex unit 255 is connected to switchback path 221 for inverting paper and temporarily holds the paper with its printed face upside down when the duplex image forming mode is selected. Here, duplex unit 255 is constructed so as to be interchangeable with a usual paper feed tray.

Figure 2:
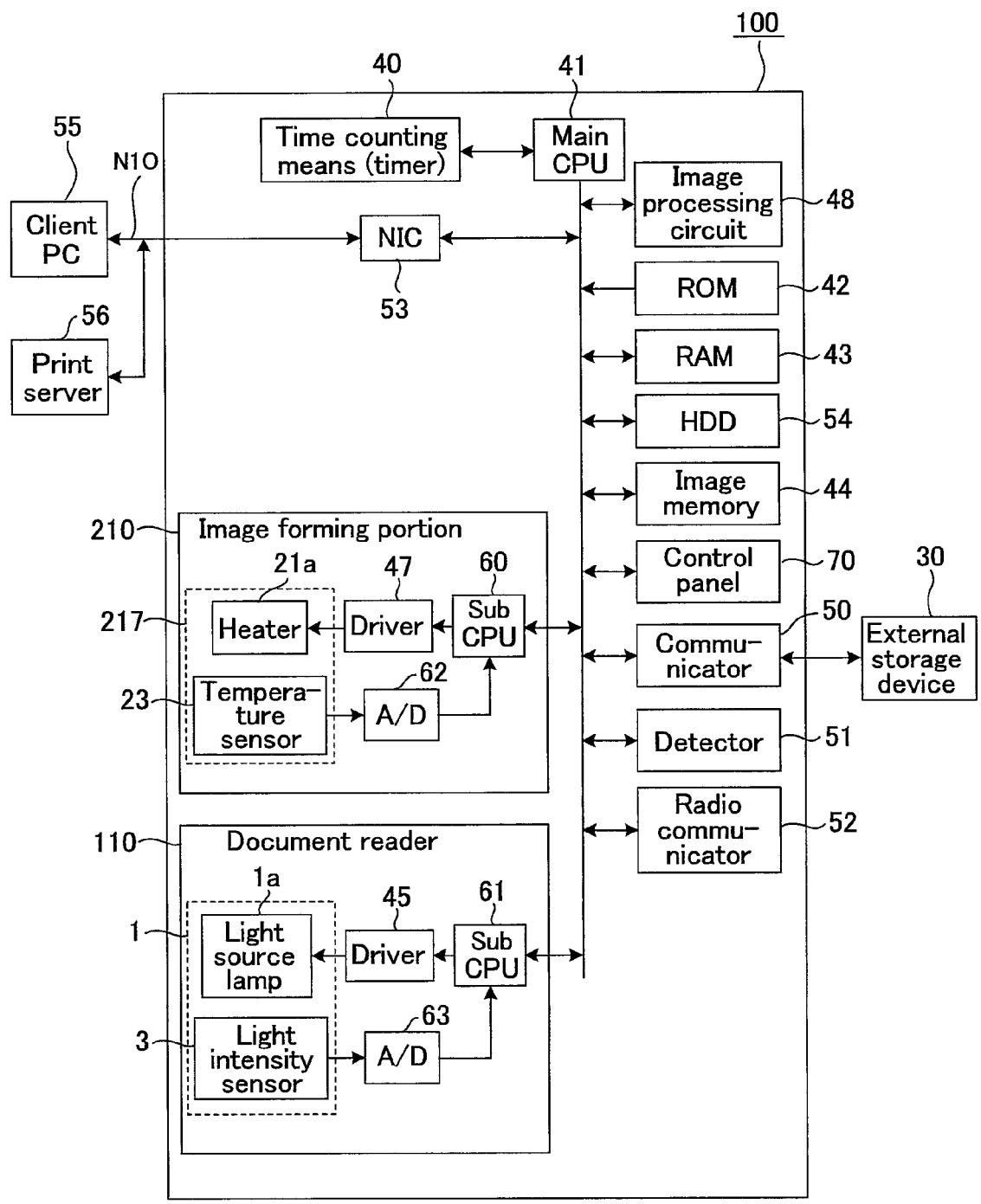
FIG. 2 is a block diagram schematically showing the electric architecture of the image processing apparatus of the same embodiment.

Next, the electric architecture of the image processing apparatus of the present embodiment will be described with reference to the drawing. FIG. 2 is a block diagram schematically showing the electric architecture of the image processing apparatus of the embodiment.

Image processing apparatus 100 includes, as a controller for the entire apparatus, a main CPU (central processing unit) 41 with ROM (read only memory) 42 that has stored control programs for controlling each of the functional portions and RAM (random access memory) 43. Connected to the main CPU 41 are an image memory 44, image processing circuit 48, HDD (hard disk drive) 54, communicator 50, detector 51, NIC 53, control panel 70 as an input control portion, radio communicator 52, image forming portion-side sub CPU 60 and a document reader-side sub CPU 61. Main CPU 41 controls the operations of all these functional components.

When power is supplied from an unillustrated power supply, main CPU 41, in accordance with the programs that are written beforehand in ROM 42, causes the input/output devices inside image processing apparatus 100 that are connected to main CPU 41 to perform their processing operations whilst unifying and controlling the input/output devices. During this period, main CPU 41 temporarily stores various input and output data such as print data and the like into predetermined memory areas in RAM 43 and executes the programs read out from ROM 42. Image data output from image processing circuit 48 is stored in image memory 44 while print data and passwords as ID information, transmitted from a client PC 55 as a remote information processing device are stored in HDD 54.

Further, in the present embodiment, main CPU 41 has a function as the confidential print determining portion. That is, when print data is transmitted from remote client PC 55, main CPU determines whether the received print data is confidential or not by detecting whether any ID information is added to the print data. When main CPU 41 has determined that the received print data is confidential by detecting the fact that the print data has ID information added to it, the confidential printing process of the present embodiment is carried out.

Further, in the present embodiment, if a print job that is transmitted from remote client PC 55 is of confidential print data, a record table for describing the job of confidential print data and its password (confidential information) transmitted with the confidential print data in a related manner is written in RAM 43.

In the present embodiment, control panel 70 has unillustrated input keys and an LCD panel so as to permit the user to make control through the input keys while displaying the usage status of image processing apparatus 100 and other various information such as the available paper sizes, magnification ratios, etc. The LCD panel used in control panel 70 may be an LCD touch screen that permits the user to input by touching the LCD screen. In the present embodiment, control panel 70, when a job of print data transmitted from remote client PC 55 is of confidential print data, also provides the function of an input control portion for allowing the user to input the password as ID information for confidential print data in order to print out the confidential print data. In other words, the user inputs the password to permit execution of a printing process of the confidential print data through the input keys on control panel 70.

Image processing circuit 48 has a function of extracting printable data from the print data transmitted from client PC 55 as an information processing device connected via communications line N10 such as an LAN or the like. In image processing circuit 48, the print data thus extracted as printable data is temporarily stored in image memory 44, then transferred to image forming portion 210, where it is printed out.

Communicator 50 performs data exchange between main CPU 41 and a removable external storage device 30 such as a USB memory device etc., while detector 51 detects whether external storage device 30 is connected to communicator 50. On the other hand, radio communicator 52 is an interface for a wireless LAN etc., and performs radio communication with devices such as notebook PCs and the like that can perform radio communications.

NIC 53 is an abbreviation of a network interface card and is a communicator that is installed in the form of an expansion card for performing network communication with client PC 55 via communications line N10. Image processing apparatus 100 performs a printing process based on the print data contained in a print job transferred from client PC 55 by way of the NIC 53 or transfers the image data obtained by document reading with document reader 110 to client PC 55.

Connected to NIC 53 is a print sever 56 having the function of dealing with printing processes in accordance with print jobs requested by different client PCs 55 that share image processing apparatus 100 in the network environment such as an LAN or the like. The detail of print server 56 will be described later.

Further, image processing apparatus 100 of the present embodiment further includes a timer 40 as a time counter for measuring the time at which image forming portion 210 is switched from normal power status to power saving status such as the energy saving mode, fuser-off mode or the like in order to save the electric power of fuser unit 217 provided for image forming portion 210 when a print request to image processing apparatus 100 has not been made for a fixed period of time or longer. Timer 40 starts measuring the elapsed time after resetting when a reset signal is transmitted from main CPU 41 and outputs the measured elapsed time to main CPU 41.

Image forming portion 210 is controlled by an image forming portion-side sub CPU 60 and includes a heater 21a, temperature sensor 23, image forming portion-side driver 47 and A/D converter 62. Temperature sensor 23 detects the temperature of heat roller 21 in fuser unit 217 and outputs the temperature data to the sub CPU 60. Image forming portion-side driver 47, based on the control data output from image forming portion-side sub CPU 60, drives heater 21a built in heat roller 21 of fuser unit 217.

Main CPU 41 transmits a predetermined warm-up command for a first recovery transaction to image forming portion-side sub CPU 60. When image forming portion-side sub CPU 60 receives the predetermined warm-up command from main CPU 41, image forming portion-side sub CPU 60 energizes heater 21a and controls the electric current through heater 21a so as to maintain the surface temperature of heat roller 21 heated by heater 21a at a predetermined temperature. When the heat roller 21 surface reaches the predetermined temperature, image forming portion-side sub CPU 60 determines that image forming has become feasible (fuser-ready status) and gives notice to main CUP 41 that the fuser-ready status has been established.

Document reader 110 is controlled by a document reader-side sub CPU 61 and includes a light source lamp 1a, light intensity sensor 3, document reader-side driver 45 and A/D converter 63. Light intensity sensor 3 detects the intensity of light that is radiated from light source lamp 1a of light source lamp unit 1 and supplies the detected light intensity data to document reader-side sub CPU 61 by way of A/D converter 63. Document reader-side driver 45, based on the control data output from document reader-side sub CPU 61, drives light source lamp 1a of light source lamp unit 1.

Main CPU 41, as the second recovery transaction, transmits a predetermined warm-up command to document reader-side sub CPU 61. When receiving the predetermined warm-up command from main CPU 41, document reader-side sub CPU 61 energizes light source lamp 1a and controls the electric current so as to maintain the light intensity of light source lamp 1a based on the light intensity information obtained from light intensity sensor 3. When the light intensity of light source lamp 1a has reached the predetermined light intensity level, document reader-side sub CPU 61 determines that document reading has become feasible (reading ready status) and gives notice to main CUP 41 that the reading ready status has been established.

Other than the above, image forming portion-side sub CPU 60 and document reader-side sub CPU 61 are connected with various input/output devices that operate during image forming and document reading operations, such as unillustrated motors, clutches, solenoids, sensors and the like, provided in image forming portion 210 and document reader 110. Image forming portion-side sub CPU 60 and document reader-side sub CPU 61 read the detected data from temperature sensor 23 and light intensity sensor 3 at predetermined timings, respectively during image forming and during document reading, and drive the motors arranged in image forming portion 210 and document reader 110, based on the detected measurements.

<Operation in Copy Mode>

Next, the printing process in copy mode in image processing apparatus 100 of the present embodiment will be described. Here, the copy mode defined in this description includes an image reading operation for reading the image of an original and an image forming operation for duplicating the read image on the paper.

In the copy mode, the user sets an original to be copied on original table 111 of document reader 110 and inputs the number of copies, magnification ratio and other data though condition input keys on control panel 70. Then, as the start key is pressed, the copying process including image reading and image forming operations starts.

In the image processing apparatus 100 thus starting the process, when the start key is pressed first, an unillustrated main drive motor starts at approximately the same time and rotates diverse drive gears. Then, paper feed roller 256 starts rotating to feed a sheet of paper. The fed paper is conveyed up to registration roller 257 through the conveying path, and is temporarily stopped at that position so as to be in synchronism with the leading end of the image on photoreceptor drum 222. Here, the leading end of the paper is uniformly pressed against registration roller 257 so that the position of the front edge of the paper is corrected.

In document reader 110, image information reading from the original is started by light exposure and scanning whilst light source lamp 1a of light source lamp unit 1 is turned on and scan unit 113 is being moved in the predetermined direction. The light emitted from light source lamp unit 1 is reflected on the document image surface, and the reflected light therefrom passes through mirrors 2a to 2c and optical lens 115 to reach CCD 116, which reads it as image information. The thus read image information is converted into image data in the form of digital data. The image data thus converted in the digital form is subjected to image processes under designated conditions and temporarily stored in image memory 44, and then supplied as image data to LSU 227.

Photoreceptor drum 222 being rotated at a predetermined rate is supplied with electric charge from main charger unit 223 so that its surface is electrified at a predetermined surface potential. LSU 227 drives semiconductor laser 11 based on the image data supplied from main CPU 41 and illuminates photoreceptor drum 222 surface by emitting the laser beam modulated based on the image data through polygon mirror 12 that is rotating at a predetermined rate. As a result, an electrostatic latent image based on the image data is formed on the surface of photoreceptor drum 222 by illumination of the laser beam from LSU 227. The photoreceptor drum 222 surface with an electrostatic latent image formed thereon is supplied with toner from developing unit 224 so that the electrostatic latent image is developed into a toner image.

The paper as the printed medium is conveyed to and between photoreceptor drum 222 and transfer device 25 by means of registration roller 256 that starts rotating in synchronization with the rotation of photoreceptor drum 222 and receives transfer of the toner image supported on photoreceptor drum 222 surface therefrom by transfer device 225. The toner remaining on the photoreceptor drum 222 surface is removed and collected together with paper particles and others by cleaner 226.

Thereafter, the paper with a toner image transferred thereon is conveyed to fuser unit 217, where it is heated and pressed being passed through the fusing nip between heat roller 21 and pressing roller 22. The toner image transferred on the paper is fused by heat under the pressure applied by these paired rollers 21 and 22 and fixed firmly to the paper surface. The paper with the toner image thus transferred and fixed thereon is discharged via discharge roller 219 to post-processing unit 260. Thus, the printing process in copy mode is completed.

<Operation in Print Mode>

Image processing apparatus 100 transfers print data input from client PC 55 as a remote information processing device via NIC 53 or image data stored in external storage device 30 connected via communicator 50, to LSU 227 of image forming portion 210. After receiving the image data at LSU 227, the image processing apparatus performs approximately the same printing process as that in the aforementioned copy mode.

Figure 3:
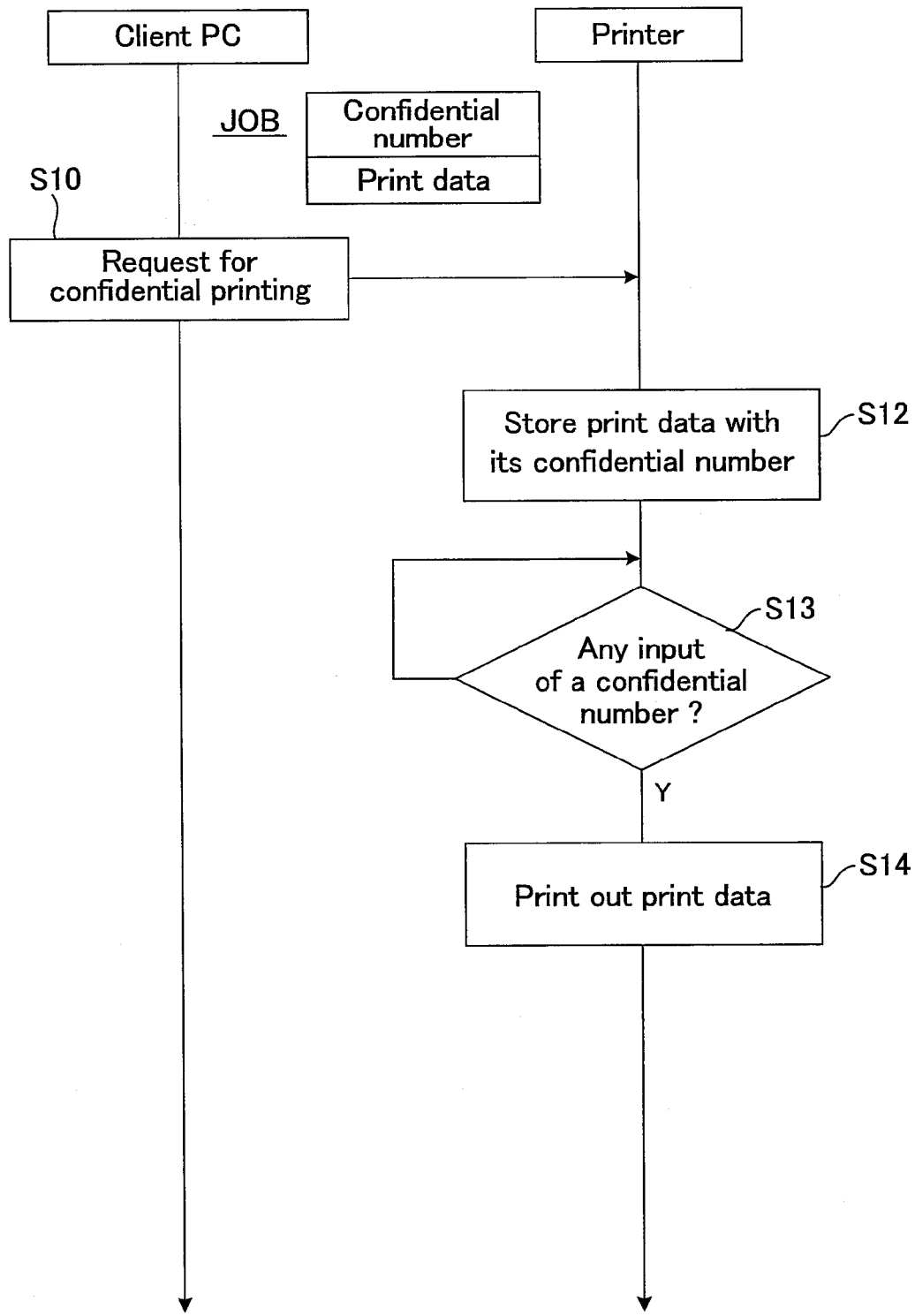
FIG. 3 is an operational flow chart for illustrating the operation of a typical confidential printing process.

Next, before describing the operational flow of a confidential printing process of the present embodiment, an operational flow of a typical confidential printing process will be described with reference to the drawing. FIG. 3 is an operational flow chart for illustrating the operation of a typical confidential printing process.

To begin with, when print data with a password as a confidential number is transferred from client PC 55 (Step S10), the printer (MFP) as the image processing apparatus stores the confidential number and print data into the storage such as an HDD or the like provided in the apparatus (Step S12). At the same time as the data is stored into the storage, a record table having the print data and confidential number classified is written into RAM that is provided for the CPU. Then, the printer (MFP) waits for input of a confidential number through the control panel as the control portion. When a confidential number is input (Step S13), the print data corresponding to the confidential number is output from the storage such as an HDD or the like (Step S14).

Next, a record table that is written in RAM when a confidential printing process of the image processing apparatus of the present embodiment is carried out will be described with reference to the drawings. FIGS. 4 to 8 are charts showing examples of recording tables that are written in RAM when a confidential printing process is carried out in the image processing apparatus of the present embodiment.

When receiving print data from client PC 55, MFP 100 as the image processing apparatus of the present embodiment stores the print data into HDD 54 and also tables the transferred print data into RAM 43 in the transferred order and outputs the print data sequentially in the order in which they were recorded in the RAM 43.

When the print data transferred from MFP 100 is not of confidential print data but normal print data, the transferred print data is recorded with a job number corresponding to the print data into a "job table" written in RAM 43, as shown in FIG. 4. On the other hand, when the transferred print data is of confidential print data, a serial number that specifies the individual information processing device such as client PC 55 or the like as the sender of the print data, is recorded with the confidential number (password) as the ID information corresponding to the confidential print data, into a "confidential job table".

Thereafter, the user inputs the confidential number, i.e., the password. When the input confidential number coincides with one of those recorded in the confidential job table, for example the confidential number of a terminal SINT2 as shown in FIG. 5, the print data transferred from terminal SINT2 is added as the latest job at the leading position of the job table while the transferred print data from the terminal SINT2 is deleted from the confidential job table, as shown in FIG. 6.

In this case, in order to enable the user who ordered the confidential print data to receive the printout of the confidential print data without being kept waiting when the user has arrived at the place of MFP 100, in the present embodiment the transferred print data from the terminal SINT2 is added at the leading position of the job table so that it can be confidentially output first of all.

Further, in the present embodiment, MFP 100, when it receives a confidential print data from a remote information processing device, also receives the sender information on the information processing device that is sending the confidential print data. Examples of the sender information include the e-mail address of the information processing device. Therefore, the confidential job table can be constructed as shown in FIG. 7 such that the sender information (e.g. e-mail address) of the information processing device such as client PC 55 or the like can be recorded with its print data. In order to give an indication that MFP 100 will enter the energy-saving mode to client PC 55 as the sender of the print data before MFP 100 enters the energy-saving mode, in the present embodiment the client PC 55, when it transmits print data as a confidential print job to MFP 100, is required to transmit a confidential number as the ID information and an e-mail address as the sender's information together with the print data.

In this way, the above configuration of MFP 100 that is able to give an indication as to transition to the energy saving mode to client PC 55 enables the user of client PC 55 that makes a print request of a confidential print job to transmit an extension request to MFP 100 to postpone the scheduled transition to the energy saving mode, in order for the user to receive the printout at a desired time. It should be noted that if different users from different client PCs 55 have transmitted extension requests to postpone the transition to the energy saving mode, the indications of extension requests are recorded in an extension request record table written in RAM 43 for every request, as shown in FIG. 8.

Figure 9:
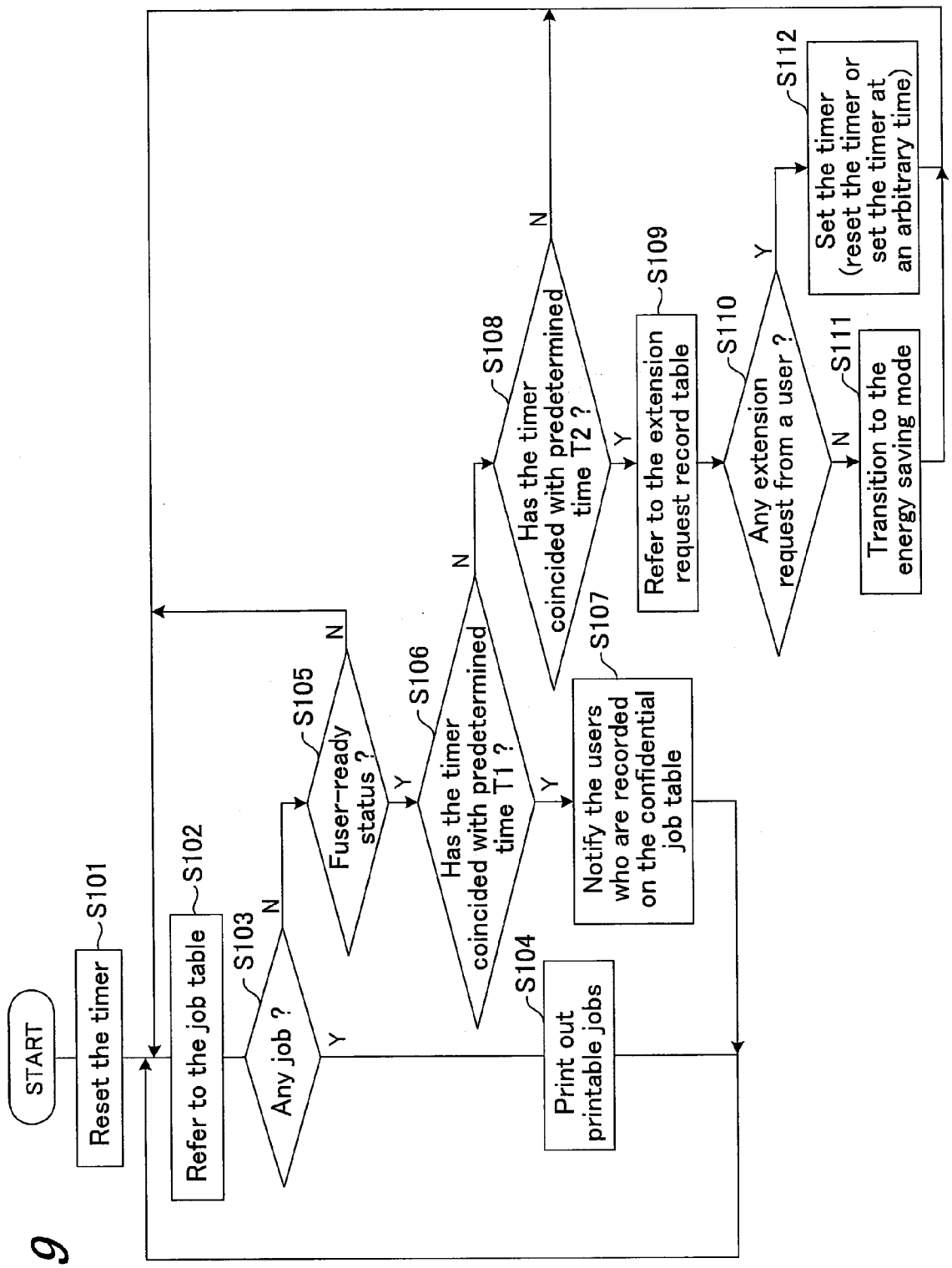
FIG. 9 is a flow chart showing the operational flow of a confidential printing process in the image processing apparatus of the same embodiment.

Next, the operation of a confidential printing process in the image processing apparatus of the present embodiment will be described with reference to the drawings. FIG. 9 is a flow chart showing the operational flow of a confidential printing process in the image processing apparatus of the present embodiment.

In the present embodiment, the operational flow detailed hereinbelow with FIG. 9 is processed by main CPU 41 as the controller of MFP 100.

First of all, timer 40 as a time counter provided for MFP 100 is reset (Step S101). After resetting timer 40, the job table written in RAM 43 is checked (Step S102) to determine if there is print data (Step S103). If it is detected at Step S103 that there is print data in the job table, printing is started and output from the first set of print data (Step S104).

In contrast, if it is detected at Step S103 that there is no print data in the job table, it is checked whether the fuser-ready status in which the fuser unit in MFP 100 has been set at the fusing temperature that permits printing is established (Step S105). When at this Step S105 establishment of the fuser-ready status is detected, then the elapsed time from the resetting of timer 40 at Step S101 is checked so as to determine whether the elapsed time has coincided to a predetermined time T1 (Step S106). This predetermined time T1 to be used for determination at Step S106 is shorter than limited time T2 for MFP 100 to enter the energy-saving mode from the resetting of timer 40.

When coincidence of the elapsed time with the predetermined time T1 is detected at Step S106, main CPU 41 gives notice that the elapsed time has coincided with the predetermined time T1 that is shorter than limited time T2 taken for MFP 100 to enter the energy-saving mode, to the e-mail address of the user's information processing device (client PC 55) as the sender of the print data which is recorded in the confidential job table (Step S107). With the above configuration of MFP 100 that gives notice that the elapsed time has coincided with the predetermined time T1 to client PC 55, it is possible for the user to optionally select either (1) transmitting a confidential print job from the PC 55 to MFP 100 so that its printout can be finished before the transition of image forming portion 210 to the energy-saving mode or (2) sending an extension request to MFP 100 to postpone the scheduled transition to the energy-saving mode of image forming portion 210 in order to let the MFP perform a print job of confidential print data at a desired time. Here, it should be noted that if the user sent an extension request from client PC 55 so as to postpone the scheduled transition of image forming portion 210 of MFP 100 to the energy save mode, the indication is written in the record table on RAM 43 as mentioned above with FIG. 8.

On the other hand, when the elapsed time detected by timer 40 has not yet coincided with the predetermined time T1 at Step S106, the CPU continues to check the output from timer 40 and determines whether the elapsed time has coincided with limited time T2 for MFP 100 to enter the energy-saving mode from the resetting of timer 40 (Step S108). When at Step S108 the elapsed time has coincided with the limited time T2, then it is determined whether there are any extension requests from users (Step S110) referring to the extension request record table shown in FIG. 8 (Step S109).

When it is determined at Step S110 that no record of user's time extension request to postpone the scheduled transition to the energy saving mode is found in the extension request record table, MFP 100 is switched from the fuser-ready status to the energy-saving mode (Step S111). On the other hand, when it is determined that there is a record of user's time extension request to postpone the scheduled transition to the energy saving mode in the extension request record table, timer 40 is set once again (Step S112).

At this Step S112, the time on timer 40 may be reset or set at 0. Alternatively, the timer may be set at an arbitrary output time for postponing the scheduled transition to the energy saving mode so that the user is able to receive the printed material that is printed out by the confidential printing mode, at a time the user wants. The extended time in this case may be set so that the timer is started from an arbitrary, designated output time within the range not longer than the limited time T2 taken for MFP 100 to enter the energy saving mode from the resetting of timer 40. In this case, if there are a plurality of confidential print jobs with extension requests to postpone the energy saving mode, the extension request times recorded in the extension request record table is checked so that the longest time among these requested extension times can be set for timer 40. Also in this case, the upper limit of the set, extended time should be the aforementioned limited time T2.

Figure 10:
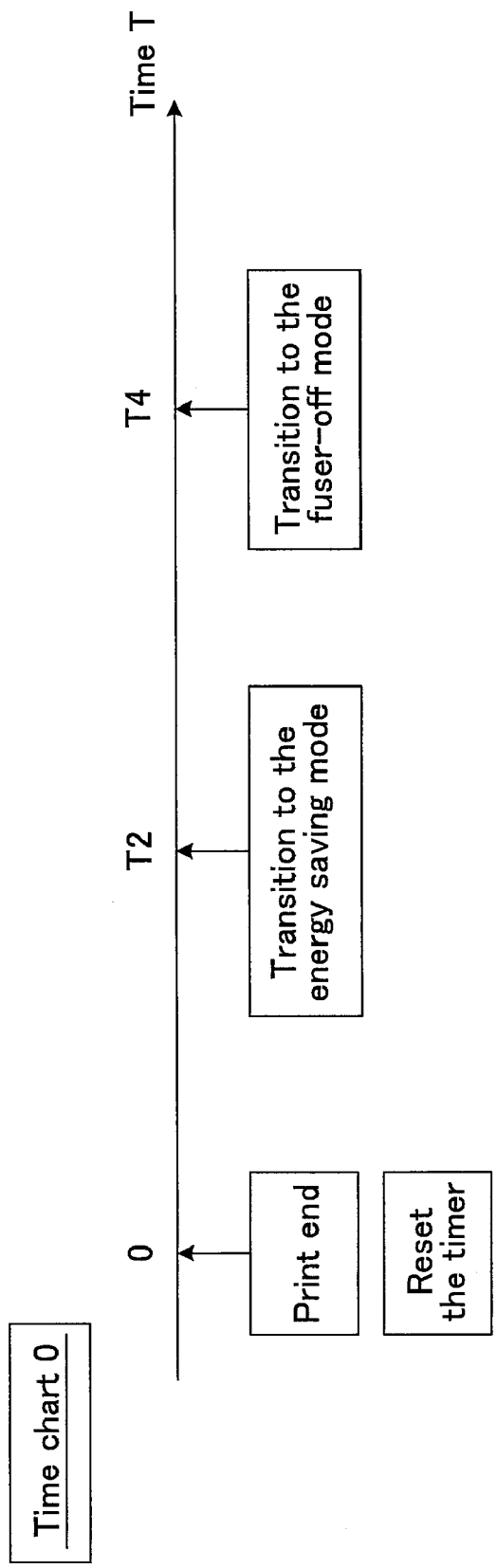
FIG. 10 is a time chart showing the operational flow of a confidential printing process in a conventional image processing apparatus.

As described heretofore, the conventional image processing apparatus is, as shown in FIG. 10, controlled to transition to the energy saving mode after a lapse of predetermined time T2 from when the timer was reset at the print end, and then transition to the fuser-off mode after a lapse of predetermined time T4. In contrast to this, in the present embodiment, the controller of MFP 100, that is, main CPU 41 makes such control as to give notice that image forming portion 210 will transition to the energy saving mode to client PC 55 after a lapse of a time T1 that is shorter than the limited time T2 taken for image forming portion 210 to transition to the energy saving mode from when timer 40 of MFP 100 was reset. In other words, MFP 100 gives the sender of print data, that is, client PC 55, an advance notice that image forming portion 210 of MFP 100 will transition to the energy saving mode, before its actual transition thereto.

Figure 11:
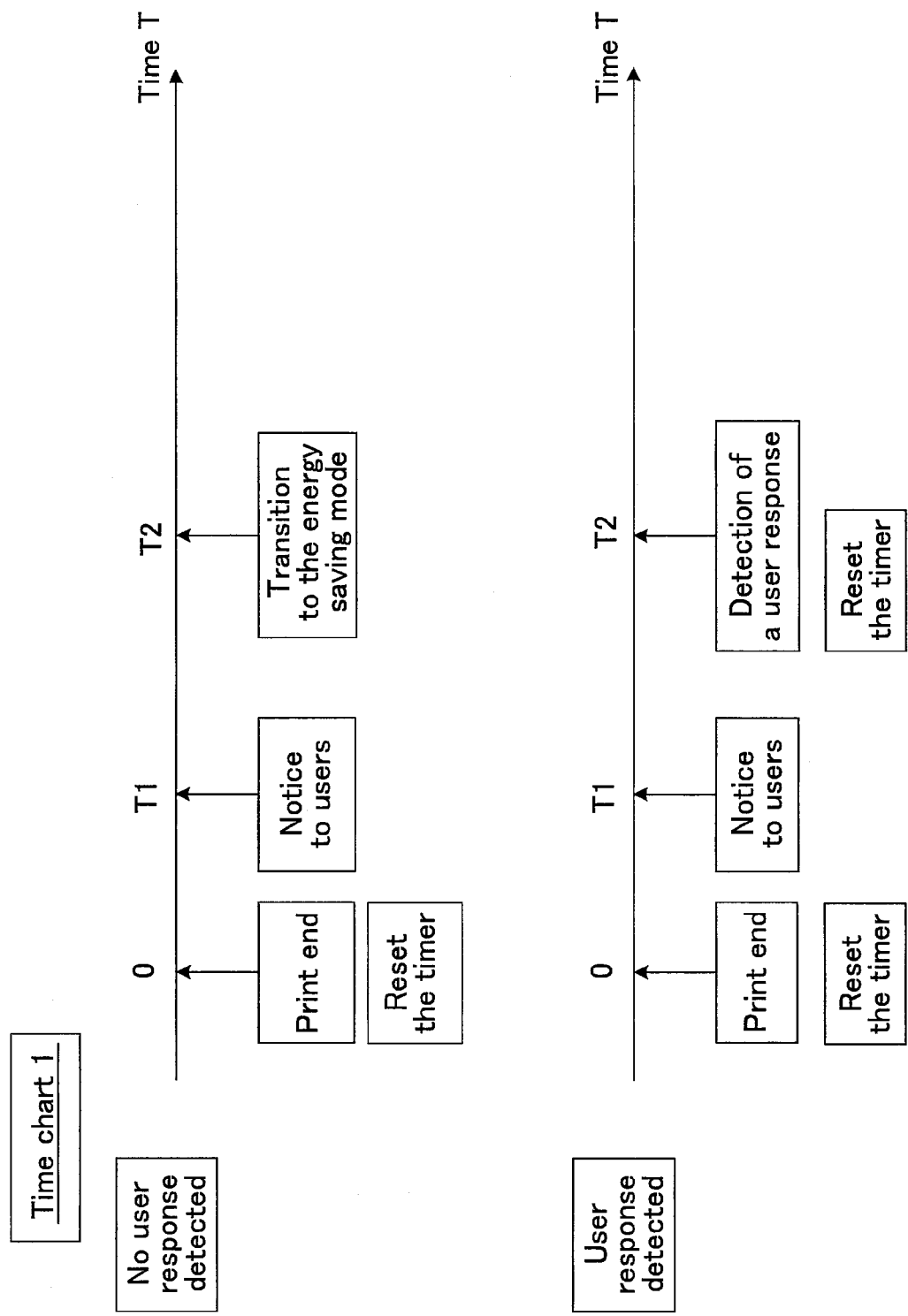
FIG. 11 is a time chart showing the operational flow of a confidential printing process in the first embodiment of the present invention.

In this way, when an advance notice of the transition of the image forming portion 210 to the energy saving mode is given from MFP 100 to client PC 55 before it happens, if an extension request from the user for putting off the start of transition to the energy saving mode is detected before MFP 100 transitions to the energy saving mode, the time up to the start of transition into the energy saving mode is postponed as shown in FIG. 11. Accordingly, it is possible to prevent user's reception of the printout of confidential print data from being delayed, due to MFP transition to the energy saving mode.

Further, since the user is also allowed to transmit a new confidential print job for printout of confidential print data before the entrance of image forming portion 210 to the energy saving mode, it is possible to carry out the printout of confidential print data before the transition of image forming portion 210 to the energy saving mode. Accordingly, it is possible to prevent a third person from picking up the printout before the user who ordered the printout of confidential print data, hence the confidentiality of confidential print data can be strictly secured.

Here, though in the present embodiment, MFP 100 is made to transition to the energy saving mode at Step S111 shown in FIG. 9, upon the transition to the energy saving mode the process described hereinbelow may be additionally carried out.

That is, first, when MFP 100 transitions from the fuser-ready status to the energy saving mode, the written content in the extension request record table is compared with the written content in the confidential job table. Upon this comparison, if any job of confidential print data with no extension request is detected, the confidential print data without extension request is deleted from HDD 54 after giving notice that the confidential print data will be deleted to the e-mail address corresponding to the confidential print data. This removal of such confidential print data that is not scheduled by the user to be printed out at hand makes it possible to secure a margin in the capacity of HDD 54 for storing confidential print data.

The Second Embodiment

Next, the second embodiment of an image processing apparatus of the present invention will be described with reference to the drawings. Since the overall configurational view showing a schematic architecture, block diagram schematically showing the electric architecture, of the image processing apparatus of this embodiment, and the charts showing examples of recording tables written in RAM when a confidential printing process is carried out are the same as those of the first embodiment, so their description is omitted.

This embodiment adopts a different operating method for a confidential printing process in the image processing apparatus. That is, the first embodiment was described on the implementation of a confidential printing process taking into account the case where MFP 100 is switched into the energy saving mode as the transition of MFP 100 to power saving status. In contrast, in this embodiment, implementation of a confidential printing process will be described taking into account the case where MFP 100 is switched into two stepwise conditions, namely, the energy saving mode and the fuser-off mode, as the transition of MFP 100 to power saving status.

Figure 12:
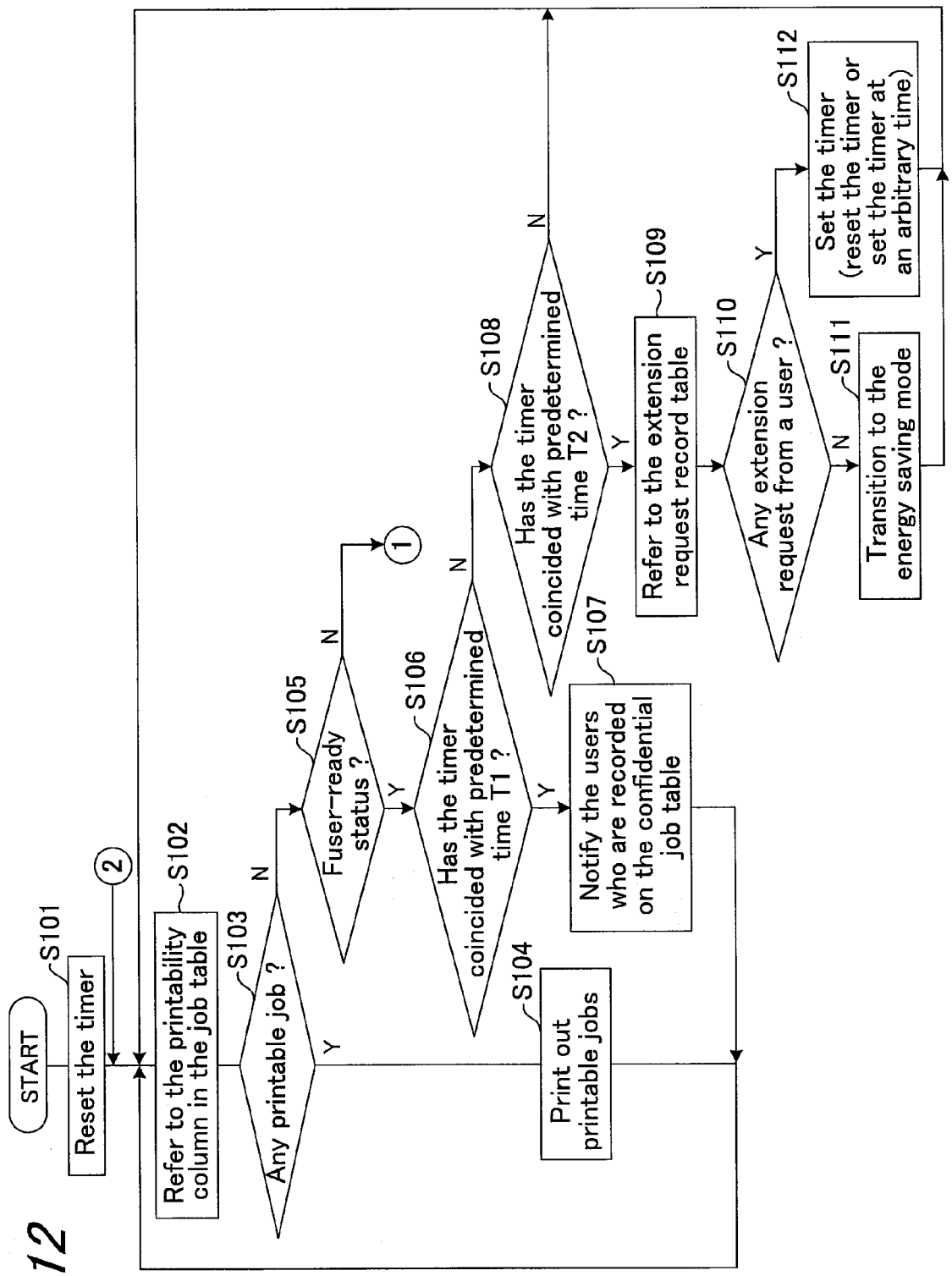
FIG. 12 is a flow chart showing the operational flow of a confidential printing process in an image processing apparatus of the second embodiment of the present invention.
Figure 13:
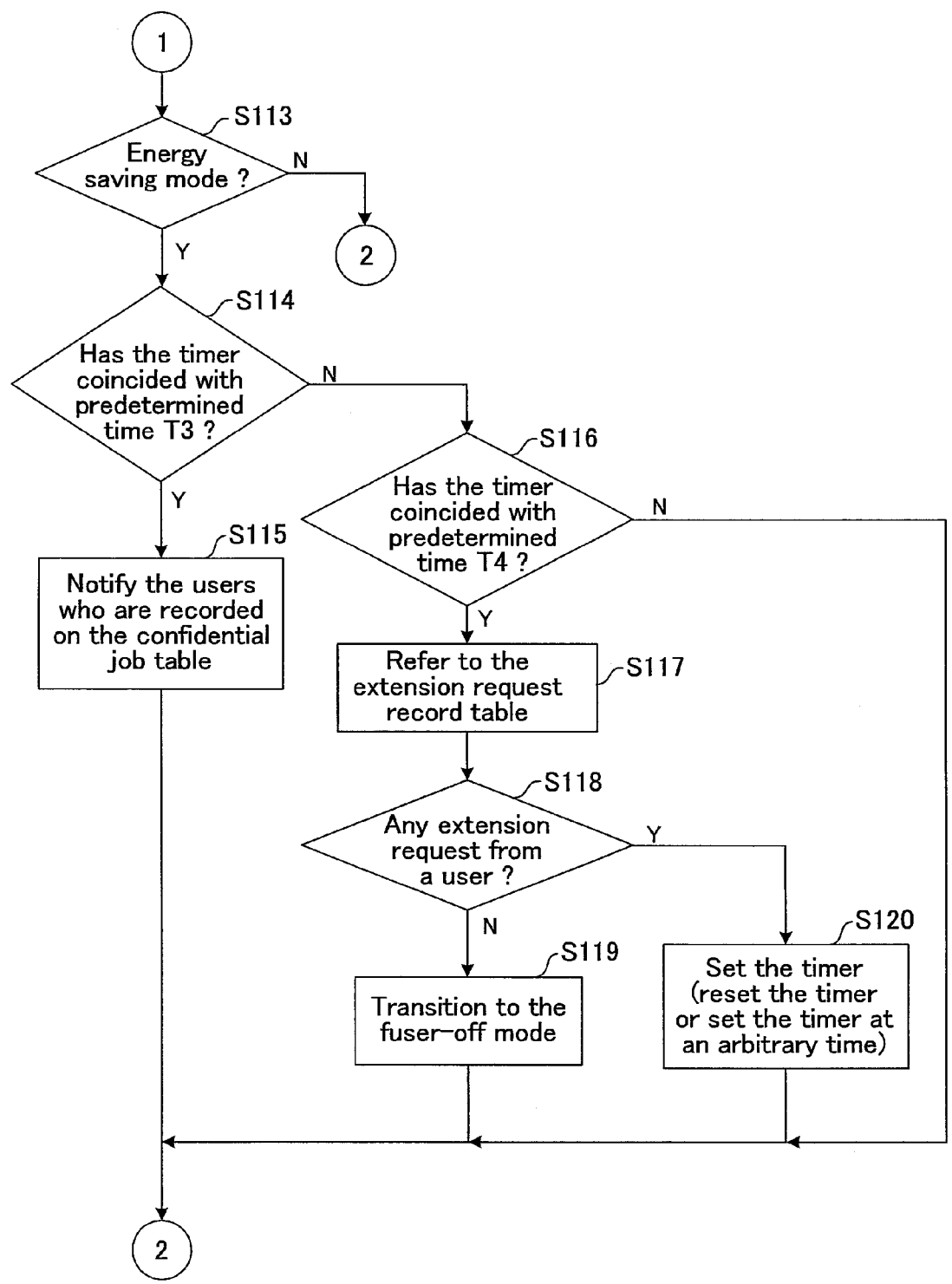
FIG. 13 is a flow chart showing the operational flow of the subsequent sequence of the confidential printing process when it is detected that the fuser is not ready at Step S105 in the confidential printing process in the image processing apparatus of the same embodiment.

Now, the operational flow of a confidential printing process in the image processing apparatus of the present embodiment will be described with reference to the drawings. FIG. 12 is a flow chart showing the operational flow of a confidential printing process in the image processing apparatus of this embodiment. FIG. 13 is a flow chart showing the subsequent operational flow in the confidential printing process after it is detected that the fuser is not ready at Step S105 in the confidential printing process in the image processing apparatus of the same embodiment.

Similarly to the first embodiment, the operational flow of the present embodiment detailed hereinbelow with FIGS. 12 and 13 is processed by main CPU 41 as the controller of MFP 100.

The present embodiment is different from the above first embodiment in the subsequent operational flow in the confidential printing process in the image processing apparatus of the same embodiment after it is detected that the fuser is not ready at Step S105 wherein the fuser is not in the fuser-ready state in which the fuser is set at a fusing temperature that permits MFP 100 to perform printing. Specifically, in the first embodiment at step 105, when it is detected that the fuser is not ready or not in the fuser-ready state in which the fuser is set at a fusing temperature that permits MFP 100 to perform printing, as shown in FIG. 9, the operation returns to the previous step, i.e., Step S102 and refers to the job table written on RAM 43 (Step S102) and then the steps following the Step S103 are executed.

In contrast, in the present embodiment, when it is detected that the fuser is not ready or not in the fuser-ready state in which the fuser is set at a fusing temperature that permits MFP 100 to perform printing, the operational flow (indicated by (1) in FIG. 12) shown in FIG. 13 starts, as shown in FIG. 12.

When it is detected that the fuser is not in its ready state at Step S105, then it is checked whether MFP 100 is in the energy saving mode as shown in FIG. 13 (Step S113). When at this Step S113 image forming portion 210 of MFP 100 is in the energy saving mode, then the elapsed time from the resetting of timer 40 at Step S114 is checked so as to determine whether the elapsed time has coincided to a predetermined time T3 (Step S114). This predetermined time T3 to be used for determination at Step S114 is shorter than limited time T4 for MFP 100 to enter the fuser-off mode from the resetting of timer 40.

On the other hand, if when it is detected at Step S113 that MFP 100 is not in the energy saving mode, the operation returns to the previous step, i.e., Step S102 and refers to the job table written on RAM 43 once again (Step S102) and then the steps following the Step S103 are executed.

When coincidence of the elapsed time with the predetermined time T3 is detected at Step S114, main CPU 41 gives notice that the elapsed time has coincided with the predetermined time T3 that is shorter than limited time T4 taken for MFP 100 to enter the fuser-off mode, to the e-mail address of the user's information processing device (client PC 55) as the sender of the print data which is recorded in the confidential job table (Step S115). With the above configuration it is possible for the user to optionally select either (1) transmitting a new confidential print job to MFP 100 so that its printout can be finished before the transition of image forming portion 210 into the fuser-off mode or (2) sending an extension request to MFP 100 to postpone the scheduled transition to the fuser-off mode of image forming portion 210 in order to let the MFP perform a print job of confidential print data at a desired time. Here, it should be note that if the user sent an extension request from client PC 55 to MFP 100 so as to postpone the scheduled transition of image forming portion 210 of MFP 100 to the fuser-off mode, the indication is written in the record table on RAM 43.

On the other hand, when the elapsed time detected by timer 40 has not yet coincided with the predetermined time T3 at Step S114, the CPU continues to check the output from timer 40 and determines whether the elapsed time has coincided with limited time T4 for MFP 100 to enter the fuser-off mode from the resetting of timer 40 (Step S116). When at Step S116 the elapsed time has coincided with the limited time T4, then it is determined whether there are any extension requests from users (Step S118) referring to the extension request record table shown in FIG. 8 (Step S117).

When it is determined at Step S118 that no record of user's time extension request to postpone the scheduled transition to the fuser-off mode is found in the extension request record table, MFP 100 is switched from the energy saving mode to the fuser-off mode (Step S119). On the other hand, when it is detected that there is a record of user's time extension request for postponing the scheduled transition to the fuser-off mode in the extension request record table, timer 40 is set once again (Step S120).

At this Step S120, the time on timer 40 may be reset or set at 0. Alternatively, the timer maybe set at an arbitrary output time for postponing the scheduled transition to the fuser-off mode so that the user is able to receive the printed material that is printed out by the confidential printing mode, at a time the user wants. The extended time in this case may be set so that the timer is started from an arbitrary, designated output time within the range not longer than the limited time T4 taken for MFP 100 to enter the fuser-off mode from the resetting of timer 40. In this case, if there are a plurality of confidential print jobs with extension requests to postpone the fuser-off mode, the requested extension times recorded in the extension request record table may be referred to so that the longest time among these requested extension times can be set for timer 40. Also in this case, the upper limit of the set, extended time should be the aforementioned limited time T4.

On the other hand, the subsequent operational flow when it is detected at Step S105 that MFP 100 is in the fuser-ready status is the same as the steps after Step S106 in the above first embodiment, so that description of these steps is omitted.

In the above way, main CPU 41 of MFP 100 makes such control as to give indications that image forming portion 210 will transition to the energy saving mode and will transition to the fuser-off mode, to client PC 55, after a lapse of time T1 that is shorter than the limited time T2 to transition to the energy saving mode from when timer 40 of MFP 100 was reset, and after a lapse of time T3 that is shorter than the limited time T4 to transition to the fuser-off mode from when timer 40 of MFP 100 was reset, respectively. In other words, MFP 100 gives the sender of print data, that is, client PC 55, advance notices that MFP 100 will transition to the energy saving mode and to the fuser-off mode, respectively before its transitions.

Figure 14:
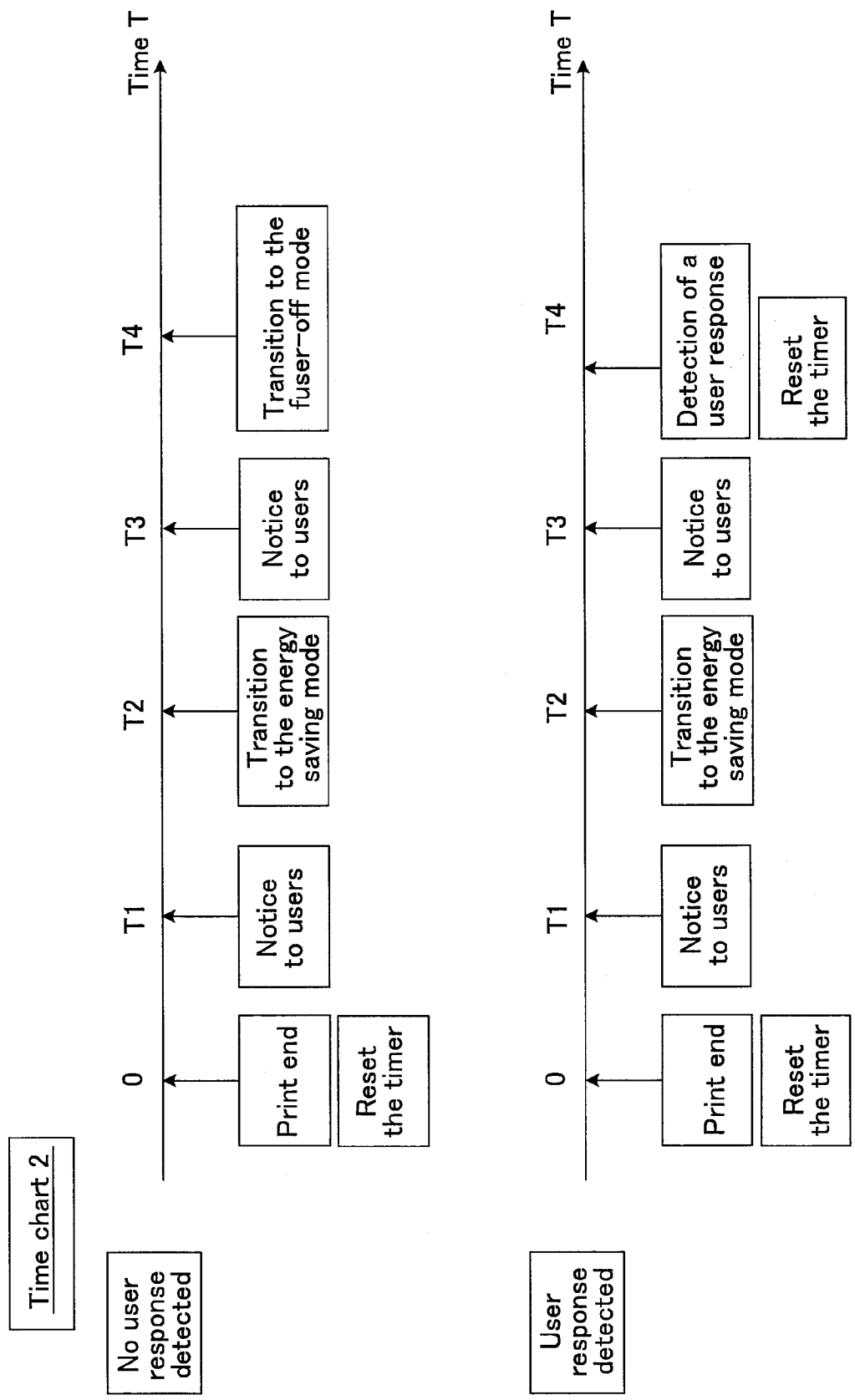
FIG. 14 is a time chart showing the operational flow of a confidential printing process in the same embodiment.

Accordingly, as shown in FIG. 14, if there is any response from a user for requesting the extension of the time before the start of transition to the energy saving mode up to the limited time T2, the transition to the energy saving mode can be postponed. If there is any response from a user for requesting the extension of the time before the start of transition to the fuser-off mode up to the limited time T4, the transition to the fuser-off mode can be postponed. In other words, when MFP 100 is set into power saving status, other than the transition to the energy saving mode, the time at which MFP 100 starts to transition to power saving status in the case of the transition to the fuser-off mode can also be postponed. As a result, when transition of MFP 100 to power saving status is implemented stepwise into two or more levels of power saving, it is possible to more effectively prevent the user's reception of the printout of confidential print data from being delayed due to transition to power saving status.

As has been described heretofore by explaining the image processing apparatus of different embodiments, the image processing apparatus of the present invention notifies the information processing device from which a print job was sent, that the image forming portion of the image processing apparatus will transition to power saving status before the transition happens. With this notice, the user is allowed to optionally select either (1) transmitting a new confidential print job whose printout can be finished before the transition of the image forming portion to the power saving status or (2) postponing the transition to power saving status so that a print job of confidential print data can be printed out at a desired time. Accordingly, it is possible to optionally select either performing printout of confidential print data before the image forming portion of the image processing apparatus transitions to power saving status or postponing the transition to the power saving status so that confidential print data can be printed out at a desired time. As a result, it is possible to prevent a third person from picking up the printout before the user who made a request for printout of confidential print data, hence the confidentiality of confidential print data can be strictly secured. It is also possible to prevent the user's reception of the printout of confidential print data from being delayed, by postponing the transition to power saving status.

As the preferred embodiment modes of the present invention have been described heretofore with reference to the accompanying drawings, it goes without saying that the present invention should not be limited to the above examples. It is apparent that various modified examples and variational examples will occur to those skilled in the art without departing from the spirit or scope of the following claims, and those should be considered to be within the technical scope of the invention.

For example, in each of the above embodiments, the controller of MFP 100, i.e., main CPU 41 executes the confidential processing control flow. However, in a network environment such as an LAN system or the like, it is also possible to use a single print server 56 having the function of dealing with print processing of print jobs from all the client PCs 55 that share image processing apparatus 100.

That is, when the image processing program for letting a computer realize the function of image processing apparatus 100 of each embodiment has been installed beforehand into the print server 56, it is possible for the print sever 56 to implement the confidential processing control flow and receive print data so that the print sever 56 causes MFP 100 to transition to the energy saving mode by issuing a predetermined command and also gives notice and other instructions to client PCs 55. In other words, in the image processing system in which an image processing apparatus receives print data from information processing devices connected thereto via a communications line such as a LAN or the like, extracts the print data in a printable form and prints out the data in its image forming portion, when the image processing apparatus has the function of each of the above embodiments, it is possible to execute printout before the image processing apparatus transitions to power saving status or to output confidential print data at a desired time.

Further, though each of the above embodiments was described referring to a case in which the external devices that transmit print jobs to the image processing apparatus are PCs, the external devices that transmit print jobs may be facsimile machines, scanners or other information processing devices that have been installed beforehand with a driver program (printer driver) for transmitting a print job to the image processing apparatus by way of the communications line.

What is claimed is:

1. An image processing apparatus which receives print data from an information processing device connected thereto via a communications network, together with sender information on the information processing device, develops the print data in a printable data form and prints out the data through an image forming portion, comprising:
    a confidential print determining portion for determining whether the print data is confidential print data;
    a storage for storing the confidential print data detected by the confidential print determining portion and ID information transmitted with the confidential print data;
    an input control portion for allowing for input of the ID information for executing a printing process of the confidential print data; and
    a controller having the function that, when detecting input of the ID information, outputs confidential print data corresponding to the input ID information and the function of causing the image forming portion to transition from normal power status to power saving status when no print request has been made to the image processing apparatus for a fixed period of time or longer,
    characterized in that in a process by which the image forming portion transitions from the normal power status to the power saving status, after the confidential print data is stored in the storage, the controller gives notice that the image forming portion will transition to the power saving status, to the information processing device before the transition;
    wherein when receiving an extension request from the information processing device to postpone the transition of the image forming portion to the power saving status after having given notice of the transition of the image forming portion to the power saving status to the information processing device, the controller delays the transition of the image forming portion to the power saving status, and
    when the controller gives notice of the transition of the image forming portion to the power saving status to the information processing device and receives no extension request to postpone the transition from the information processing device, the controller deletes the confidential print data transmitted from the information processing device, from the storage.

2. The image processing apparatus according to claim 1, wherein when receiving the extension request from the information processing device, the controller delays the transition to the power saving status in accordance with the designated extension time indicated by the extension request.

3. The image processing apparatus according to claim 1, wherein when the controller receives a plurality of extension requests, and if the extension times indicated by the extension requests are different, the controller selects the longest extension time among those designated by the extension requests to delay the transition to the power saving status by the selected extension time.

4. The image processing apparatus according to claim 1, wherein the storage contains a job table for recording the print data and a confidential job table for recording the confidential print data, and when the ID information is input, the confidential print data corresponding to the input ID information is transferred from the confidential job table to the job table.

5. The image processing apparatus according to claim 1, wherein the power saving status of the image forming portion includes a multiple of power saving modes, and every time the image forming portion transitions to each of the power saving modes, the controller gives notice that the image forming portion will transition for the information processing device to the power saving mode before the transition to the power saving mode.

6. A non-transitory computer-readable medium encoded with a computer program for causing a computer to realize the functions of the image processing apparatus according to claim 1.

7. An image processing system in which an image processing apparatus that receives print data from an information processing device connected thereto via a communications network, together with sender information on
the information processing device, develops the print data in a printable data form and prints out the data through an image forming portion, characterized in that the information processing device comprises a notifying portion which, after the information processing device receives notice that the image forming portion will transition from normal power status to power saving status, sends an extension request for postponing the transition of the image forming portion to the power saving status, and
the image processing apparatus includes:
a confidential print determining portion for determining whether the print data is confidential print data;
a storage for storing the confidential print data detected by the confidential print determining portion and ID information transmitted with the confidential print data;
an input control portion for allowing for input of the ID information for executing a printing process of the confidential print data; and
a controller having the function that, when detecting input of the ID information, outputs confidential print data corresponding to the input ID information and the function of switching the image forming portion from normal power status to power saving status when no print request has been made to the image processing apparatus for a fixed period of time or longer,
in a process by which the image forming portion transitions from the normal power status to the power saving status, after the confidential print data is stored in the storage, the controller gives notice that the image forming portion will transition to the power saving status, to the information processing device before the transition, thereafter, when the controller receives an extension request from the information processing device to postpone the transition of the image forming portion to the power saving status, the controller delays the transition of the image forming portion to the power saving status;
wherein when receiving an extension request from the information processing device to postpone the transition of the image forming portion to the power saving status after having given notice of the transition of the image forming portion to the power saving status to the information processing device, the controller delays the transition of the image forming portion to the power saving status, and
when the controller gives notice of the transition of the image forming portion to the power saving status to the information processing device and receives no extension request to postpone the transition from the information processing device, the controller deletes the confidential print data transmitted from the information processing device, from the storage.

* * * * *